UNITED STATES PATENT OFFICE.

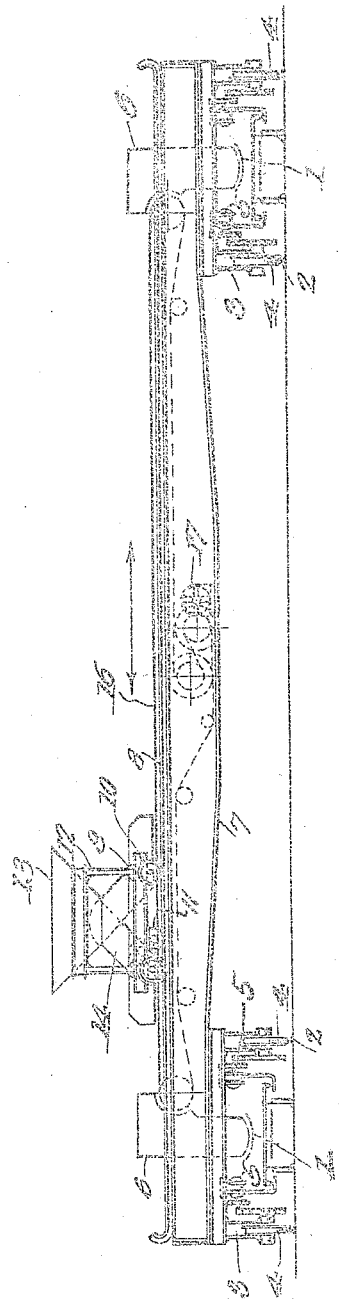

FRANCIS LEE STUART, OF WASHINGTON, DISTRICT OF COLUMBIA, ASSIGNOR TO INTERNATIONAL CONVEYOR CORPORATION, OF NEW YORK, N. Y.

RECLAIMING AND CONVEYING APPARATUS.

1,348,599.  Specification of Letters Patent.  Patented Aug. 3, 1920.

Application filed December 5, 1917. Serial No. 205,607.

*To all whom it may concern:*

Be it known that I, FRANCIS LEE STUART, a citizen of the United States, residing in the city of Washington and District of Columbia, have invented certain new and useful Improvements in Reclaiming and Conveying Apparatus, of which the following is a specification.

This invention relates to apparatus for conveying material from a place of supply to distant points by means of belt conveyers, and the object of this invention is to provide an apparatus to which material may be supplied and which will deliver it to either of two belt conveyers which may carry the material to any desired point of delivery.

In carrying out my invention, I provide two main conveyer belts which may be of indefinite length and which are arranged between the rails of two parallel tracks. On each of said tracks I arrange a truck which is motor driven and which is equipped with a hopper which delivers to the conveyer belt beneath it. The two trucks support a frame in which is mounted a conveyer belt adapted to deliver to either of said hoppers. Said belt is motor driven and may be moved in either direction by properly operating the motor. On said frame is a track which supports a truck provided with an open-mouthed hopper adapted to deliver material to two chutes which in turn convey the material to the conveyer belt on said frame.

The arrangement is such that material may be delivered in any desired way to said last mentioned hopper either by a digger or by other means, and may be delivered to either of the main conveyer belts.

The accompanying drawings is an end view of reclaiming apparatus embodying my improvements.

Each of the conveyer belts 1 is arranged between the rails 2 of a track parallel with said conveyer. On each track is mounted a truck 3, the wheels 4 of which are driven by motors 5. Each truck 3 supports a hopper 6 which delivers to the belt beneath it. The two trucks are connected by a horizontally arranged reclaimer frame 7, said frame being supported at each end by one of said trucks. On said frame is a track consisting of rails 8 which support a truck 9, the wheels 10 of which are driven by a motor 11. Said truck supports a frame 12 on which is mounted an open-mouthed hopper 13 which delivers to two chutes 14, 15. The truck 9 may be moved by the motor 11 in either direction and held at any desired position on the reclaimer frame.

Material may be supplied to the open-mouthed hopper 13 by any suitable apparatus such as a digger and may be conveyed by the belt 16 of the reclaimer frame to either of the main conveyer belts. The belt 16 is driven by a motor 17 and may be operated in either direction.

In this way material may be received from apparatus working on either side of the reclaimer frame between the two main conveyer belts and may be carried by said belts to distant points.

I claim as my invention:

Apparatus for reclaiming and conveying material, comprising two parallel main conveyer belts, trucks mounted to move parallel with said belts, motors for driving the trucks, hoppers carried by the trucks and delivering to the main conveyer belts, a reclaimer frame supported by said trucks, a conveyer belt mounted in said frame and delivering to either of said hoppers, a motor for driving said belt in either direction, a track on the reclaimer frame, a truck supported thereon, a motor for driving said truck, and a hopper carried by said truck and delivering to the conveyer belt of said reclaimer frame.

In testimony whereof, I have hereunto subscribed my name.

FRANCIS LEE STUART.